(12) United States Patent
Komatsumoto

(10) Patent No.: US 8,226,478 B2
(45) Date of Patent: Jul. 24, 2012

(54) GAME MACHINE, GAME MACHINE CONTROL METHOD, AND INFORMATION STORAGE MEDIUM

(75) Inventor: Hidenori Komatsumoto, Chiba (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1011 days.

(21) Appl. No.: 12/097,000

(22) PCT Filed: Nov. 2, 2006

(86) PCT No.: PCT/JP2006/322003
§ 371 (c)(1),
(2), (4) Date: Jun. 11, 2008

(87) PCT Pub. No.: WO2007/072635
PCT Pub. Date: Jun. 28, 2007

(65) Prior Publication Data
US 2009/0170600 A1   Jul. 2, 2009

(30) Foreign Application Priority Data
Dec. 19, 2005  (JP) .................................. 2005-365414

(51) Int. Cl.
*A63F 13/00* (2006.01)
(52) U.S. Cl. .................... 463/32; 463/30; 463/31; 463/4
(58) Field of Classification Search .................... 463/30, 463/31, 32, 4
See application file for complete search history.

(56) References Cited

U.S. PATENT DOCUMENTS

| | | | |
|---|---|---|---|
| 5,890,906 A * | 4/1999 | Macri et al. .................. | 434/247 |
| 6,280,323 B1 * | 8/2001 | Yamazaki et al. ................ | 463/4 |
| 6,606,104 B1 * | 8/2003 | Kondo et al. ................ | 715/764 |
| 2007/0004482 A1 * | 1/2007 | Ando et al. ...................... | 463/6 |

FOREIGN PATENT DOCUMENTS

EP     0844580 A     5/1998
(Continued)

OTHER PUBLICATIONS

Supplementary European Search Report dated Nov. 19, 2008.
Chinese Office Action corresponding to Application No. 200680047791.7, dated Apr. 1, 2011.
Japanese Office Action issued in Japanese Application No. 2005-365414 dated Jun. 14, 2011.

*Primary Examiner* — Dmitry Suhol
*Assistant Examiner* — Brandon Gray
(74) *Attorney, Agent, or Firm* — Sughrue Mion, PLLC

(57) ABSTRACT

To provide a game machine for providing a sport game to be played between an operation target team and an opponent team, which allows a game player to relatively readily find out the position of a teammate player object. A position announcing sound data storage unit (72) stores position announcing sound data in association with a relative position condition concerning the relative position of the teammate player object relative to the position and reference direction of the operation target player object. A relative position determination unit (76) determines whether or not the relative position of the teammate player object selected by the position announcement target selection unit (74), relative to the position and reference direction of the operation target player object, satisfies the relative position condition associated with the position announcing sound data. A position announcing sound output control unit (78) controls a sound output unit (80) so as to output a sound based on the position announcing sound data associated with the relative position condition determined by the relative position determination unit (76) as satisfying the relative position condition.

13 Claims, 12 Drawing Sheets

FOREIGN PATENT DOCUMENTS

| | | |
|---|---|---|
| EP | 1052000 A | 11/2000 |
| EP | 1557211 A | 7/2005 |
| GB | 2 365 362 A | 2/2002 |
| JP | 07-178246 A | 7/1995 |
| JP | 2001-353370 A | 12/2001 |
| JP | 2002-325964 A | 11/2002 |
| JP | 2004-283521 A | 10/2004 |
| JP | 2005-342120 A | 12/2005 |

* cited by examiner

FIG.4
(a)
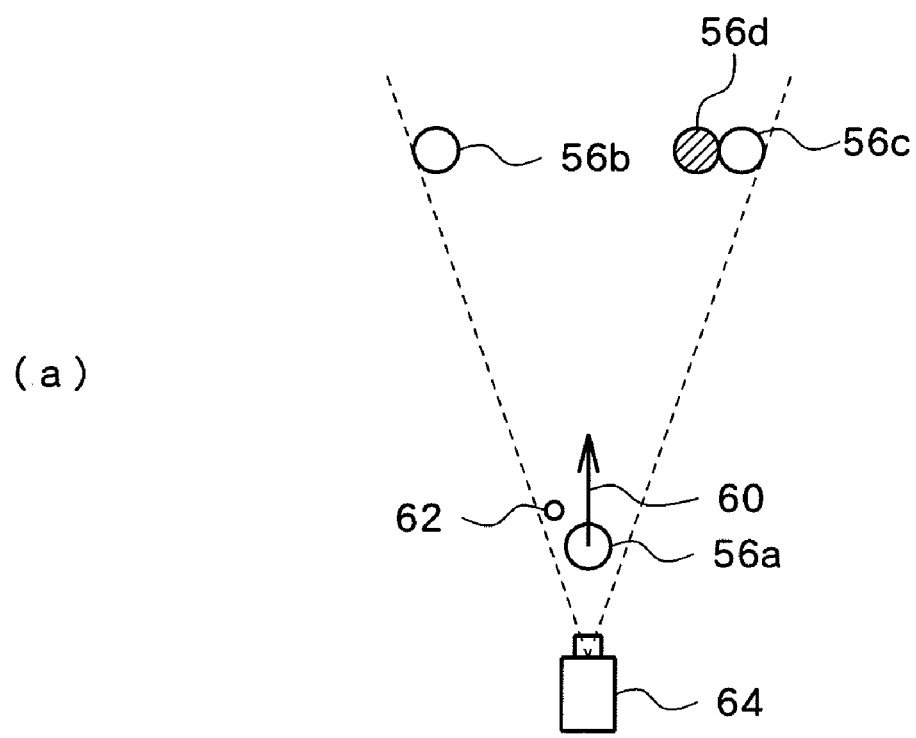
(b)
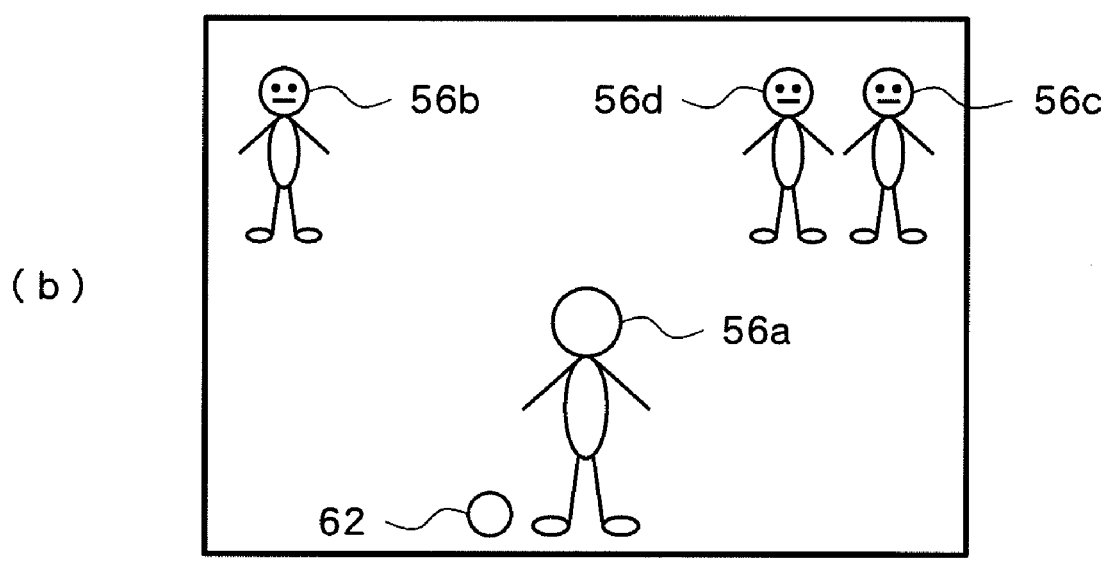

FIG.5
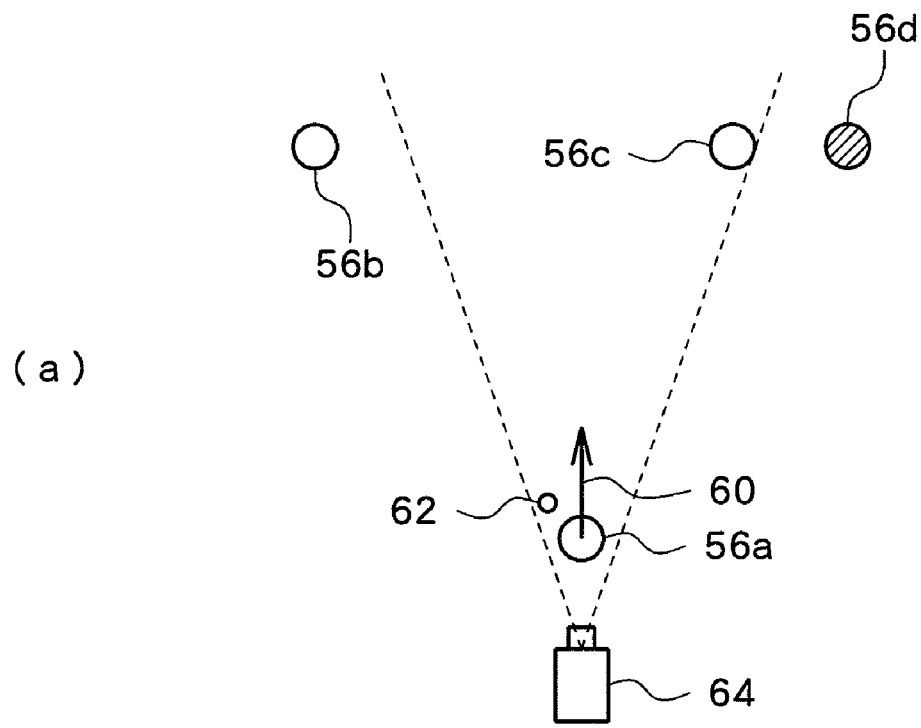
(a)
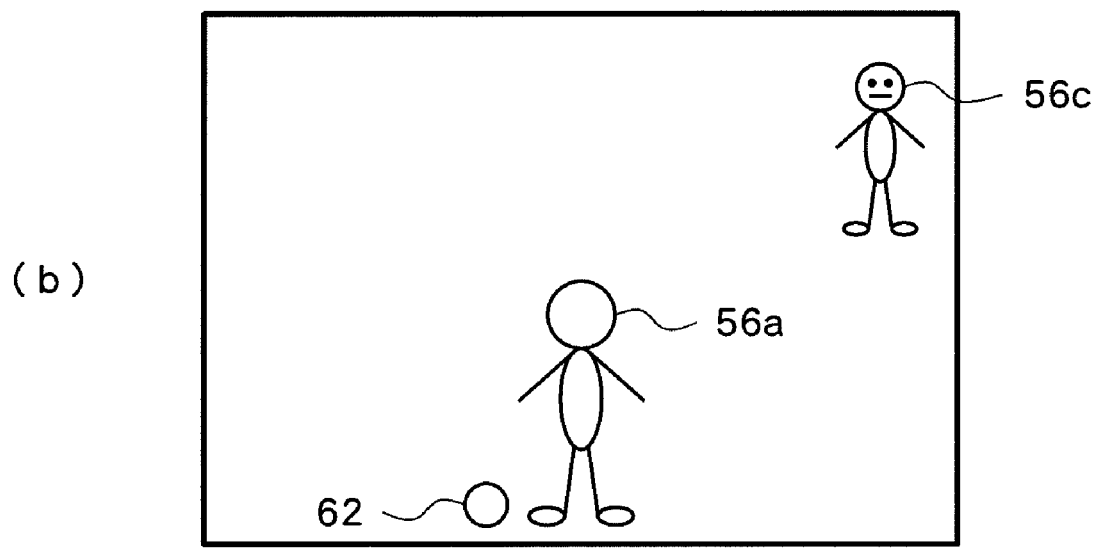
(b)

FIG.6
(a)
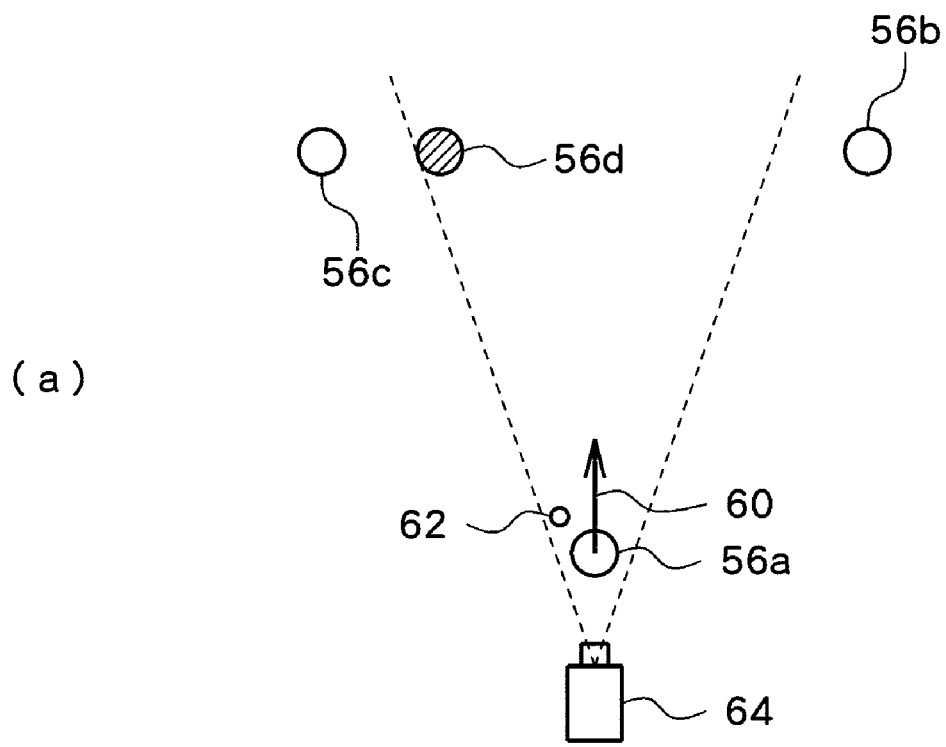
(b)
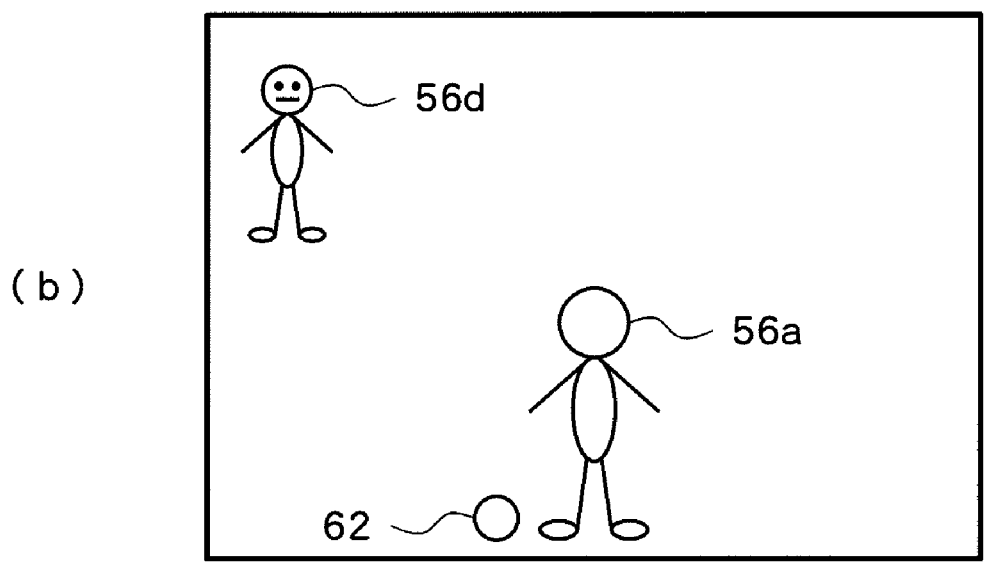

FIG.8

| RELATIVE POSITION CONDITION | | POSITION ANNOUNCING SOUND DATA |
|---|---|---|
| TEAMMATE PLAYER OBJECT LOCATED BEHIND OPERATION TARGET PLAYER OBJECT | — | POSITION ANNOUNCING SOUND DATA A (PASS BEHIND!) |
| TEAMMATE PLAYER OBJECT NOT LOCATED BEHIND OPERATION TARGET PLAYER OBJECT | TEAMMATE PLAYER OBJECT LOCATED LEFT IN VIEW OF OPERATION TARGET PLAYER OBJECT | TEAMMATE PLAYER OBJECT SHOWN ON GAME SCREEN | POSITION ANNOUNCING SOUND DATA B (PASS TO THE LEFT!) |
| | | TEAMMATE PLAYER OBJECT NOT SHOWN ON GAME SCREEN | POSITION ANNOUNCING SOUND DATA C (LONG PASS TO THE LEFT!) |
| | TEAMMATE PLAYER OBJECT LOCATED RIGHT IN VIEW OF OPERATION TARGET PLAYER OBJECT | TEAMMATE PLAYER OBJECT SHOWN ON GAME SCREEN | POSITION ANNOUNCING SOUND DATA D (PASS TO THE RIGHT!) |
| | | TEAMMATE PLAYER OBJECT NOT SHOWN ON GAME SCREEN | POSITION ANNOUNCING SOUND DATA E (LONG PASS TO THE RIGHT!) |

FIG. 11

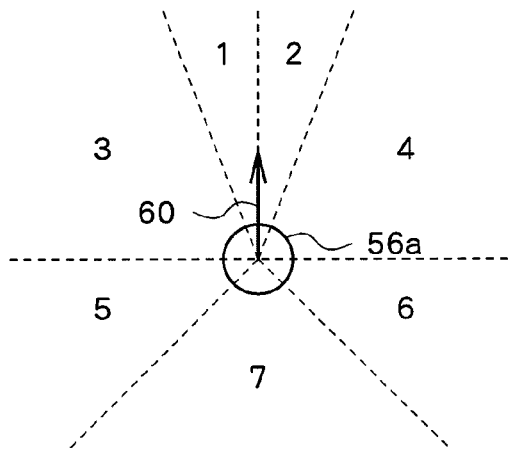

FIG. 12

| AREA | POSITION ANNOUNCING SOUND DATA |
|---|---|
| 1 | POSITION ANNOUNCING SOUND DATA 1 (PASS TO THE LEFT!) |
| 2 | POSITION ANNOUNCING SOUND DATA 2 (PASS TO THE RIGHT!) |
| 3 | POSITION ANNOUNCING SOUND DATA 3 (LONG PASS TO THE LEFT!) |
| 4 | POSITION ANNOUNCING SOUND DATA 4 (LONG PASS TO THE RIGHT!) |
| 5 | POSITION ANNOUNCING SOUND DATA 5 (PASS BEHIND TO THE LEFT!) |
| 6 | POSITION ANNOUNCING SOUND DATA 6 (PASS BEHIND TO THE RIGHT!) |
| 7 | POSITION ANNOUNCING SOUND DATA 7 (PASS BEHIND!) |

GAME MACHINE, GAME MACHINE CONTROL METHOD, AND INFORMATION STORAGE MEDIUM

TECHNICAL FIELD

The present invention relates to a game machine, a game machine control method, and an information storage medium.

BACKGROUND ART

There is known a game machine for displaying a game screen image showing a picture obtained by viewing, from a predetermined viewpoint, a virtual three dimensional space where an operation target player object which moves according to an operation carried out by a game player, a plurality of teammate player objects belonging to the same team as the team to which the operation target player object belongs, and opponent player objects belonging to an opponent team are placed, to thereby provide a sport game to be played by the team to which the operation target player object belongs, and the opponent team. One example of such game machines is one which provides a soccer game, an ice hockey game, and so forth.

Patent Document 1: Japanese Patent Laid-open Publication No. 2005-342120

DISCLOSURE OF THE INVENTION

Problems to be Solved by the Invention

On a game screen for the above-described sport game, in general, only a part of the virtual three dimensional space, but not the entirety thereof, is shown, and thus some of the teammate player objects may not be shown on the game screen. Therefore, the game player may not fully comprehend the positions of all teammate player objects, and consequently may have a problem, when controlling the operation target player object so as to pass the ball to a teammate player object, in deciding in which direction the ball should be passed. This is addressed in the aforementioned conventional sport game by showing on the game screen a so-called radar image representative of the placement of the player objects in the virtual three dimensional space (the entire field) so that the game player can comprehend the positions of the teammate and opponent player objects. However, operating the operation target player object while looking at the radar image is not easy for the game player (more particularly, a less trained player).

The present invention has been conceived in view of the above, and aims to provide a game machine, a game machine control method, and an information storage medium for allowing a game player to relatively readily comprehend the positions of the teammate player objects.

Means for Solving the Problems

In order to address the above-described problem, according to one aspect of the present invention there is provided a game machine for displaying a game screen image showing a picture obtained by viewing from a predetermined viewpoint a virtual three dimensional space where an operation target player object which moves according to an operation carried out by a game player and a plurality of teammate player objects belonging to the same team as a team to which the operation target player object belongs are placed, to thereby provide a sport game to be played by the team to which the operation target player object belongs and an opponent team, comprising position announcing sound data storage means for storing position announcing sound data in association with a relative position condition concerning a relative position of the teammate player object relative to a position and a reference direction of the operation target player object; position announcement target selection means for selecting a position announcement target teammate player object from among the plurality of teammate player objects; relative position determination means for determining whether or not the relative position of the teammate player object selected by the position announcement target selection means relative to the position and reference direction of the operation target player object satisfies the relative position condition associated with the position announcing sound data; and position announcing sound output control means for reading position announcing sound data associated with the relative position condition which is determined by the relative position determination means as satisfying the relative position condition, from the position announcing sound data storage means, and controlling so as to output a sound based on the position announcing sound data read.

According to another aspect of the present invention, there is provided game machine control method for controlling a game machine for displaying a game screen image showing a picture obtained by viewing from a predetermined viewpoint a virtual three dimensional space where an operation target player object which moves according to an operation carried out by a game player and a plurality of teammate player objects belonging to the same team as a team to which the operation target player object belongs are placed, to thereby provide a sport game to be played by the team to which the operation target player object belongs and an opponent team, comprising a position announcement target selection step of selecting a teammate player object as a position announcement target from among the plurality of teammate player objects; a relative position determination step of determining whether or not a relative position of the teammate player object selected at the position announcement target selection step, relative to a position and a reference direction of the operation target player object, satisfies a relative position condition associated with position announcing sound data stored in position announcing sound data storage means for storing the position announcing sound data in association with the relative position condition concerning the relative position of the teammate player object relative to the position and reference direction of the operation target player object; and a position announcing sound output control step of reading position announcing sound data associated with the relative position condition which is determined at the relative position determination step as satisfying the relative position condition, from the position announcing sound data storage means, and controlling sound output means so as to output a sound based on the position announcing sound data read.

According to still another aspect of the present invention, there is provided a computer readable information storage medium recording a program causing a computer, including, for example, a consumer game machine, a commercial game machine, a portable game machine, a portable phone, a personal computer, a server computer, or the like, to operate as a game machine for displaying a game screen image showing a picture obtained by viewing from a predetermined viewpoint a virtual three dimensional space where an operation target player object which moves according to an operation carried out by a game player and a plurality of teammate player objects belonging to the same team as a team to which the operation target player object belongs are placed, to thereby provide a sport game to be played by the team to which the operation target player object belongs and an opponent team, the computer operating as position announcing sound data storage means for storing position announcing sound data in association with a relative position condition concerning a relative position of the teammate player object relative to a position and a reference direction of the operation target player object; position announcement target selection means for selecting a position announcement target teammate player object from among the plurality of teammate player objects; relative position determination means for determining whether or not the relative position of the teammate player object selected by the position announcement target selection means, relative to the position and reference direction of the operation target player object, satisfies the relative position condition associated with the position announcing sound data; and position announcing sound output control means for reading position announcing sound data associated with the relative position condition which is determined by the relative position determination means as satisfying the relative position condition, from the position announcing sound data storage means, and controlling so as to output a sound based on the position announcing sound data read.

Also, the information storage medium according to the present invention may be a computer readable information storage medium where the above described program is recorded. The program distribution device according to the present invention may be a program distribution device having an information storage medium where the above described program is recorded, for reading the above described program from the information storage medium, and distributing the program. Also, the program distribution method according to the present invention may be a program distribution method, using an information storage medium where the above described program is recorded, for reading the above described program from the information storage medium, and distributing the program.

The present invention relates to a game machine for displaying a game screen image showing a picture obtained by viewing from a predetermined viewpoint a virtual three dimensional space where an operation target player object which moves according to an operation carried out by a game player and a plurality of teammate player objects belonging to the same team as the team to which the operation target player object belongs are placed, to thereby provide a sport game to be played by the team to which the operation target player object belongs, and an opponent team. According to the present invention, position announcing sound data is stored in association with a relative position condition concerning a relative position of the teammate player object relative to the position and reference direction of the operation target player object. Also, according to the present invention, a position announcement target teammate player object is selected from among the plurality of teammate player objects. It is then determined whether or not the relative position of that teammate player object relative to the position and reference direction of the operation target player object satisfies the relative position condition associated with the position announcing sound data. Then, position announcing sound data is read based on the result of the determination, and a sound based on the position announcing sound data is output. According to the present invention, the game player can relatively readily comprehend the position of the teammate player object.

In one embodiment of the present invention, the viewpoint may move according to movement of the operation target player object, and the relative position condition may include a condition concerning whether or not the teammate player object is shown on the game screen. With the above, different position announcing sound data can be output in cases where the position announcement target teammate player object is shown, and is not shown, on the game screen image, respectively.

In one embodiment of the present invention, an opponent player object belonging to the opponent team may be placed in the virtual three dimensional space, and the position announcement target selection means may determine whether or not to select the teammate player object as a position announcement target, based on the position of the teammate player object and that of the opponent player object. With the above, it is possible to arrange such that the game player can relatively readily comprehend the position of the teammate player object selected based on the positions of the teammate player object and the opponent player object. For example, it is possible to arrange such that the game player can relatively readily comprehend the position of the teammate player object with no opponent player object present nearby.

BRIEF DESCRIPTION OF THE DRAWINGS

FIG. 4 is a diagram showing one example of the positions of player objects and a game screen image;

FIG. 5 is a diagram showing one example of the positions of the player objects and a game screen image;

FIG. 6 is a diagram showing one example of the positions of the player objects and a game screen image;

FIG. 8 is a diagram showing one example of content stored in a position announcing sound data storage unit;

FIG. 11 is one example of a relative area relative to the reference position and reference direction of an operation target player object;

FIG. 12 is a diagram showing another example of content stored in the position announcing sound data storage unit.

BEST MODE FOR CARRYING OUT THE INVENTION

In the following, one example of an embodiment of the present invention will be described in detail with reference to the accompanying drawings.

Figure 1:
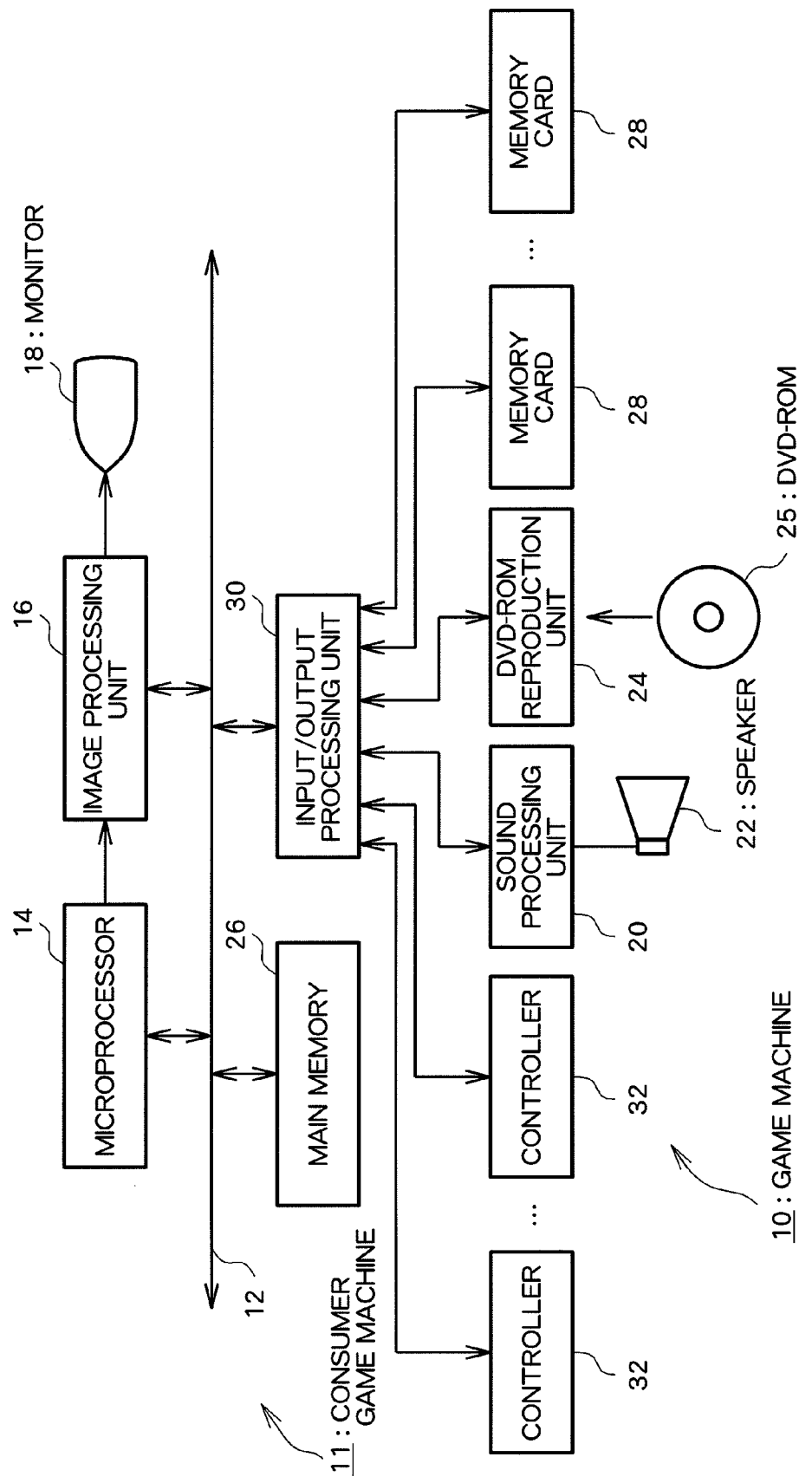
FIG. 1 is a diagram showing a hardware structure of a game machine according to one embodiment of the present invention.

FIG. 1 is a diagram showing a hardware structure of a game machine according to an embodiment of the present invention. The shown game machine 10 comprises a consumer game machine 11 having a DVD-ROM 25 and a memory card 28, or information storage media, mounted thereto, and a monitor 18 and a speaker 22 connected thereto. For example, the monitor 18 may be a home-use television set receiver, and the speaker 22 may be a built-in speaker thereof.

The consumer game machine 11 is a publicly known computer game system comprising a bus 12, a microprocessor 14, an image processing unit 16, a sound processing unit 20, a DVD-ROM reproduction unit 24, a main memory 26, an input/output processing unit 30, and a controller 32. The respective structural elements other than the controller 32 are accommodated in an enclosure.

The bus 12 is used for exchanging an address and/or data among the respective units of the consumer game machine 11. The microprocessor 14, the image processing unit 16, the main memory 26, and the input/output processing unit 30 are connected via the bus 12 for data exchange.

The microprocessor 14 controls the respective units of the consumer game machine 11, based on an operation system stored in a ROM (not shown), a program read from the DVD-ROM 25, and data read from the memory card 28. The main memory 26 comprises a RAM, for example, into which the program read from the DVD-ROM 25 and/or data read from the memory card 28 is written when required. The main memory 26 is used also as a working memory of the microprocessor 14.

The image processing unit 16, which comprises a VRAM, renders a game screen image into the VRAM, based on the image data sent from the microprocessor 14, then converts the content of the rendered game screen image into a video signal, and outputs the video signal to the monitor 18 at a predetermined timing.

The input/output processing unit 30 is an interface via which the microprocessor 14 accesses the sound processing unit 20, the DVD-ROM reproduction unit 24, the memory card 28, and the controller 32. The sound processing unit 20, the DVD-ROM reproduction unit 24, the memory card 28, and the controller 32 are connected to the input/output processing unit 30.

The sound processing unit 20, which comprises a sound buffer, reproduces various sound data, such as game music, game sound effects, a message, and so forth, which is read from the DVD-ROM 25 and stored in the sound buffer, and outputs via the speaker 22.

The DVD-ROM reproduction unit 24 reads a program recorded in the DVD-ROM 25 according to an instruction sent from the microprocessor 14. It should be noted that although the DVD-ROM 25 is used here to provide a program to the consumer game machine 11, any other information storage medium, such as a CD-ROM, a ROM card, or the like, may be used. Alternatively, a program may be provided via a data communication network, such as the Internet, or the like, from a remote place to the consumer game machine 11.

The memory card 28 comprises a nonvolatile memory (for example, EEPROM, or the like). The consumer game machine 11 has a plurality of memory card slots defined therein each for accepting a memory card 28, so that a plurality of memory cards 28 can be inserted into the consumer game machine 11 at the same time. The memory card 28 is removable from the slot and stores various game data, such as saved data, or the like.

The controller 32 is a general purpose operation input means for inputting various game operations by the game player. The input/output processing unit 30 scans the states of the respective units of the controller 32 in a constant cycle (every $1/60^{th}$ of a second, for example) and sends an operation signal describing the scanning result to the microprocessor 14 via the bus 12. The microprocessor 14 determines the game operation carried out by the game player, based on an operation signal. The consumer game machine 11 is adapted to connection to a plurality of controllers 32. The microprocessor 14 controls a game, based on the operation signals input from the respective controllers 32.

Figure 2:
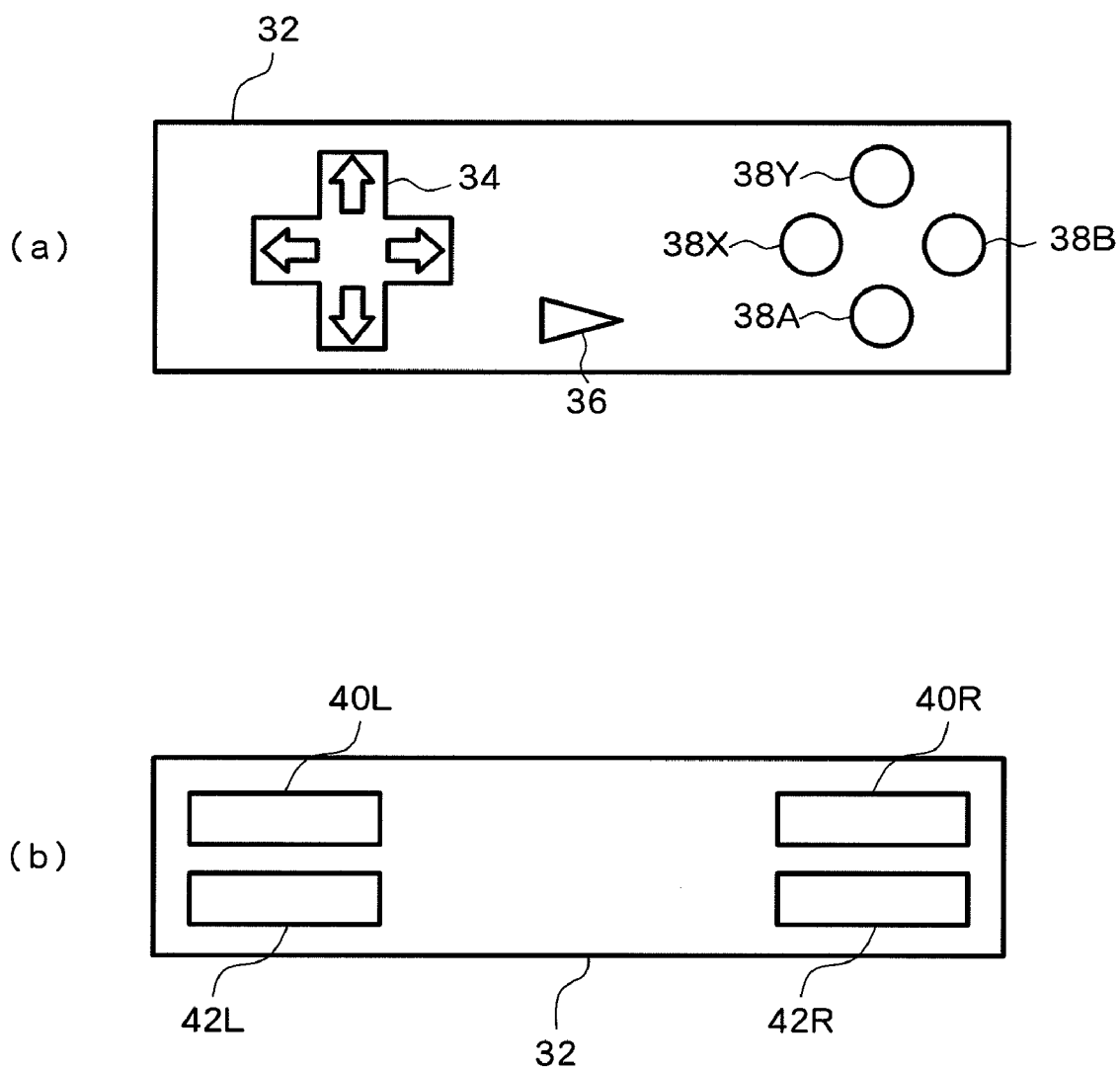
FIG. 2 is a diagram showing one example of a controller.

FIG. 2 is a diagram showing one example of the controller 32. The shown controller 32 is a general-purpose game controller. The controller 32 has, as shown in FIG. 2(a), a direction button 34, a start button 36, buttons 38X, 38Y, 38A, 38B, all provided on the front surface thereof, and as shown in FIG. 2(b), the buttons 42L, 42R, provided on the left and right sides, respectively, of the lateral surface thereof closer to the front surface 32a, and the buttons 40L, 40R similarly provided but closer to the rear surface. The direction button 34 is a cross shaped button generally used to designate a direction in which to move the character and/or cursor. The start button 36 is a small triangle press button generally used to start and/or forcibly end the game. The buttons 38X, 38Y, 38A, 38B, 40L, 40R, 42L, 42R are used for other game operations.

In the game machine 10 having the above-described hardware structure, the game player (or the user) operates the player objects (a player character object representative of a soccer player) belonging to an operation target team (hereinafter referred to as a player team) such that a soccer game is carried out aiming to produce more score events than the opponent team. The soccer game is realized by executing a soccer game program read from the DVD-ROM 25.

Figure 3:
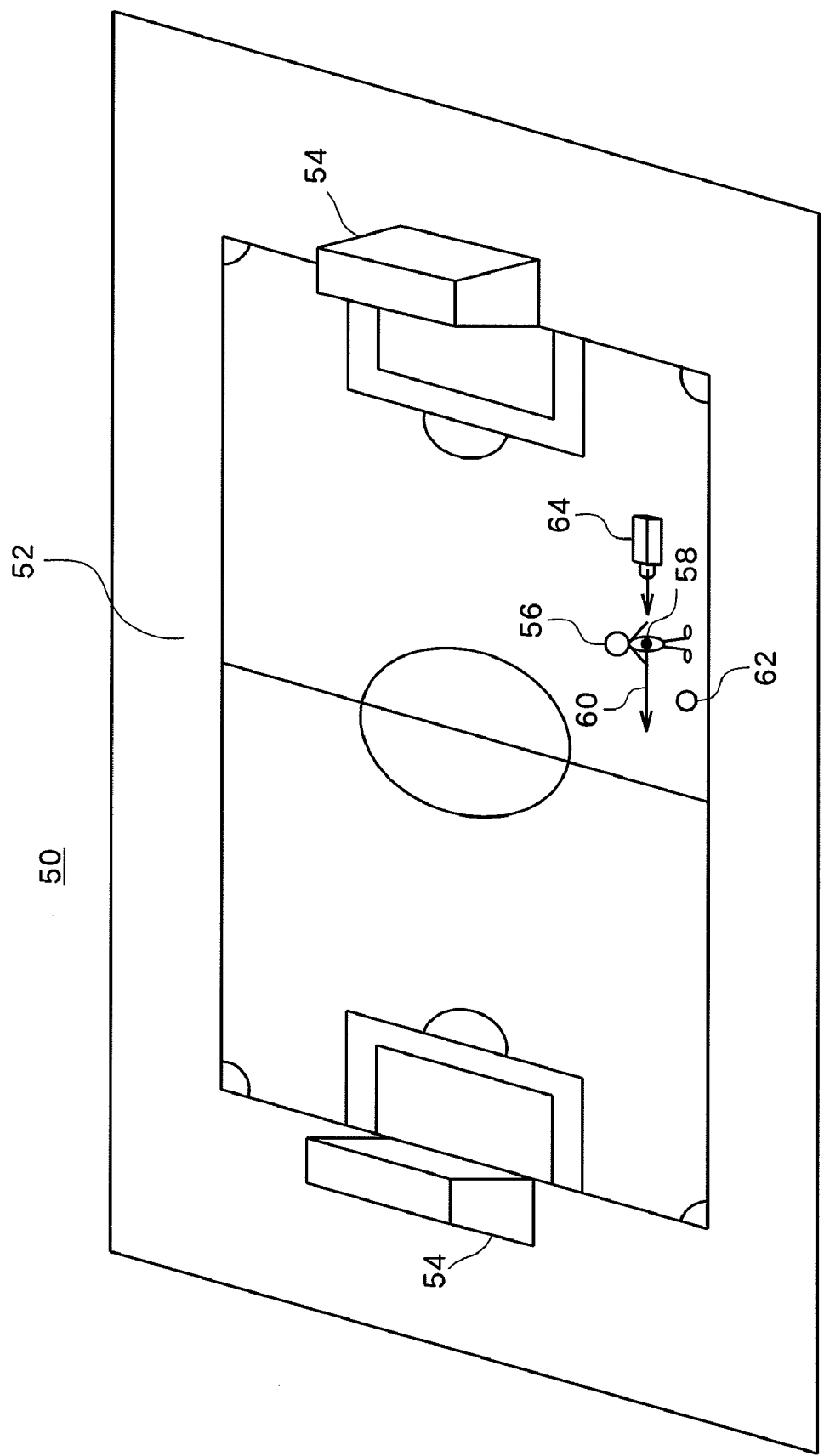
FIG. 3 is a perspective view showing one example of a virtual three dimensional space.

In the game machine 10, with the aforementioned program executed, a virtual three-dimensional space (a game space) is created in the main memory 26. FIG. 3 shows one example of a virtual three dimensional space created in the main memory 26. As shown in FIG. 3, in the virtual three dimensional space 50, a field object 52 and goal objects 54 representative of a soccer play ground are placed, constituting a soccer game field.

Player objects 56 and a ball object 62 representative of a soccer ball are placed on the field object 52. Although only one player object 56 is shown in FIG. 3, twenty-one other player objects 56 are placed on the field object 52. The player object 56 is associated with either the player team or the opponent team.

Any of the player objects 56 belonging the player team is operated as a player to be operated by the game player. The position and posture of the player 56 (hereinafter referred to as an operation target player object) to be operated by the game player in the virtual three dimensional space 50 vary according to an operation signal input from the controller 32.

For example, with the game player pressing either the upper or lower direction instructing unit of the direction button 34, the operation target player object moves forward or backward. With the game player pressing either the left or right direction instructing unit of the direction button 34, the operation target player object changes the body orientation thereof so as to face in the instructed direction.

As the operation target player object approaches the ball object 62, the operation target player object is associated with the ball object 62 under a predetermined condition, with the ball object 62 thereafter moving according to movement of that player object 58. This is represented by the player object 58 dribbling the ball object 62, shown on the monitor 18. With the game player then pressing either a pass instruction button (the button 38A, for example) or a shoot instruction button (the button 38X), together with the direction button 34, the operation target player object passes or shoots the ball. In this case, the ball is passed or shot in the direction corresponding to the operation carried out with the direction button 34. For example, when the game player presses the pass instruction button while pressing the left direction instructing unit of the direction button 34, the ball is passed to the left from the point of view of the operation target player character.

The player objects 56 (hereinafter referred to as teammate player objects) other than the operation target player object among the player objects 56 belonging to the player team and the player objects 56 (hereinafter referred to as opponent player objects) belonging to the opponent team are automatically controlled by the computer according to a predetermined algorithm. It should be noted that it may be arranged such that a plurality of game players may cooperatively control the player team, and that in such a case, at least one teammate player object is operated as an operation target player object of another game player, moving according to the operation made by that game player.

A virtual camera 64 is placed in the virtual three dimensional space 50. The virtual camera 64 moves according to movement of the operation target player object. In this embodiment, the position (a viewpoint position) of the virtual camera 64 is located behind the operation target player object, specifically, at a position having a predetermined positional relationship with the reference position 58 of the operation target player object. Further, the direction (a sight direction) of the virtual camera 64 is set directed in the direction same as the reference direction 60 (front direction) of the operation target player object. A game screen image representative of a picture obtained by viewing the virtual three dimensional space 50 from the virtual camera 64 is shown on the monitor 18. That is, a game screen image representative of a picture obtained by viewing the virtual three dimensional space 50 from behind the operation target player object, that is, a so-called rear viewpoint game screen image, is shown in this embodiment. It should be noted that the position, posture, and so forth of the virtual camera 64 may be set such that a game screen image with a so-called first or third person viewpoint may be shown on the monitor 18.

When the virtual camera 64, the operation target player object 56a, the teammate player objects 56b, 56c, and the opponent player object 56d are placed as shown in FIG. 4(*a*), for example, a game screen image such as is shown in FIG. 4(*b*), for example, is shown on the monitor 18. In FIG. 4(*a*), the dotted line represents the view field range of the virtual camera 64.

When the virtual camera 64, the operation target player object 56a, the teammate player objects 56b, 56c, and the opponent player object 56d are placed as shown in FIG. 5(*a*), for example, the game screen image such as is shown in FIG. 5(*b*), for example, is shown on the monitor 18. In this case, the teammate player object 56b and the opponent player object 56d are located outside the view field range, and thus not shown on the game screen.

When the virtual camera 64, the operation target player object 56a, the teammate player objects 56b, 56c, and the opponent player object 56d are placed as shown in FIG. 6(*a*), for example, the game screen image such as is shown in FIG. 6(*b*), for example, is shown on the monitor 18. In this case, the teammate player objects 56b and 56c are located outside the view field range, and thus not shown on the game screen.

In this embodiment, when there is a teammate player object having no opponent player object present therearound, the relative position of that teammate player object relative to the reference position 58 and reference direction 60 of the operation target player object is announced by a sound.

For example, in the situations shown in FIGS. 4 to 6, as there is no opponent player object 56d around the teammate player object 56b, a sound announcing the relative position of the teammate player object 56b is output. For example, in the situation shown in FIG. 4, a sound "pass to the left!" is output via the speaker 22. In the state shown in FIG. 5, for example, a sound "long pass to the left!" is output via the speaker 22. In the situation shown in FIG. 5, as no teammate player object 56b is shown on the game screen, different from the situation shown in FIG. 4, a sound announcing differently from that in FIG. 4 is output. Similarly, in the situation shown in FIG. 6, for example, a sound "long pass to the right!" is output via the speaker 22.

When a teammate player object with no opponent player object present nearby is located behind the operation target player object, a sound "pass behind!" is output via the speaker 22.

As described above, in the game machine 10, when there is a teammate player object with no opponent player object present nearby, a sound announcing the relative position of that teammate player object relative to the reference position 58 and reference direction 60 of the operation target player object is output. Thus, the game player can relatively readily know the relative position of a teammate player object with no opponent player object present nearby, and can smoothly control the operation target player object so as to pass the ball to that teammate player object, for example.

Figure 7:
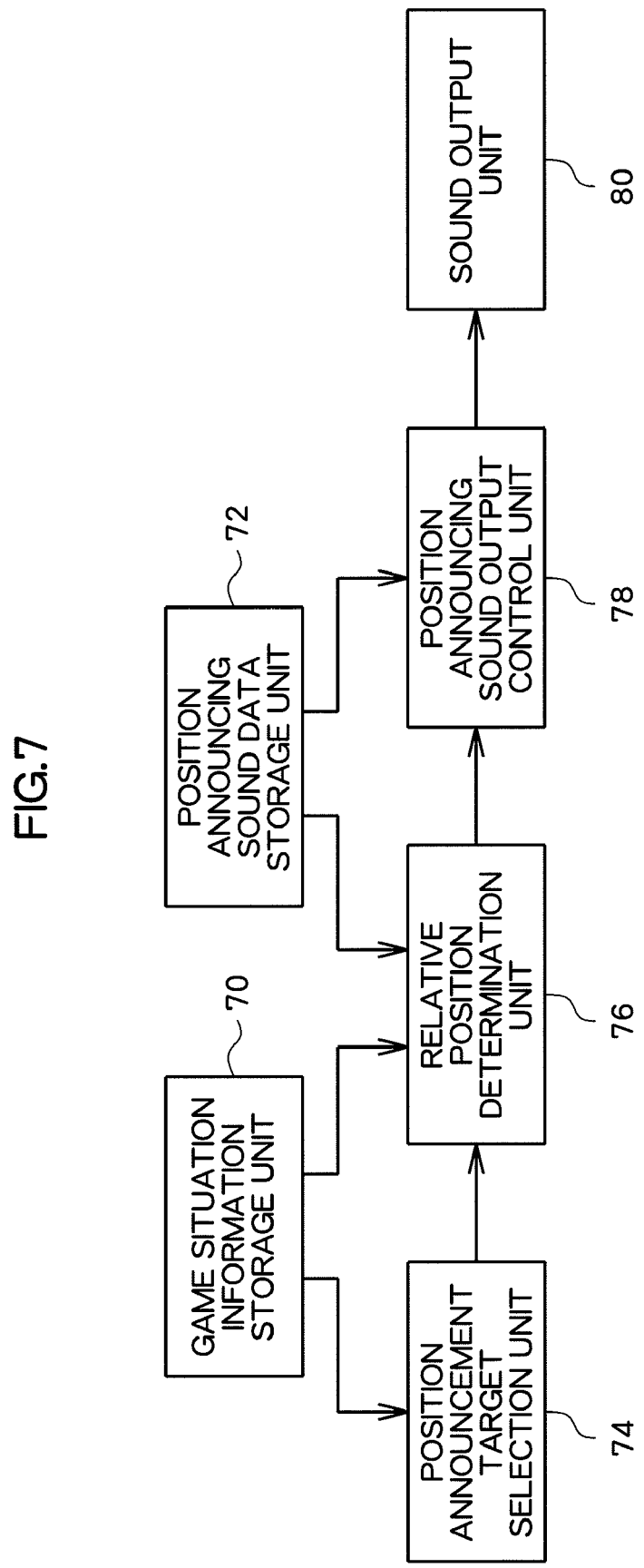
FIG. 7 is a functional block diagram of the game machine according to this embodiment.

In the following, a structure for realizing the above-mentioned functions will be described. FIG. 7 is a functional block diagram showing the functions according to the present invention among those realized in the game machine 10. As shown in FIG. 7, the game machine 10 comprises, in terms of functions, a game situation information storage unit 70, a position announcing sound data storage unit 72, a position announcement target selection unit 74, a relative position determination unit 76, a position announcing sound output control unit 78, and a sound output unit 80. These functions are realized by the microprocessor 14 executing a program supplied from the DVD-ROM 25 or transmitted via a network.

[Game Situation Information Storage Unit]

The game situation information storage unit 70 is realized using the main memory 26 as a main component. The game situation information storage unit 70 stores game situation information which describes game situation. For example, information describing the states (position, posture, movement direction, moving speed, whether or not the ball object 62 is being held, kind and position of motion data in reproduction, and so forth) of the respective player objects 56 and that (position, movement direction, moving speed, and so forth) of the ball object 62 placed in the virtual three dimensional space 50 is stored in the game situation information storage unit 70. The content stored in the game situation information storage unit 70 is updated based on the operation carried out to the controller 32, for example.

[Position Announcing Sound Data Storage Unit]

The position announcing sound data storage unit 72 is realized using the DVD-ROM 25 as a main element. The position announcing sound data storage unit 72 stores position announcing sound data in association with a relative position condition concerning the relative position of a teammate player object relative to the reference position 58 and reference direction 60 of the operation target player object. FIG. 8 shows one example of content stored in the position announcing sound data storage unit 72.

[Position Announcement Target Selection Unit]

The position announcement target selection unit 74 is realized using the microprocessor 14 as a main component. The position announcement target selection unit 74 selects a position announcement target teammate player object from among the teammate player objects placed in the virtual three dimensional space 50. In this embodiment, the position announcement target selection unit 74 selects, as a position announcement target player object, a teammate player object with no opponent player object present nearby from among those placed in the virtual three dimensional space 50. That is, whether or not to select a certain teammate player object as a position announcement target is determined based on the positions of that teammate player and positions of the opponent player objects.

[Relative Position Determination Unit]

The relative position determination unit 76 is realized using the microprocessor 14 as a main component. The relative position determination unit 76 determines whether or not the "relative position of a teammate player object selected by the position announcement target selection unit 74 relative to the reference position 58 and reference direction 60 of the operation target player object" satisfies the relative position condition associated with the position announcing sound data stored in the position announcing sound data storage unit 72.

[Position Announcing Sound Output Control Unit and Sound Output Unit]

The position announcing sound output control unit 78 is realized using the microprocessor 14 and the sound processing unit 20 as main components. The sound output unit 80 is realized using the speaker 22 as a main component. The position announcing sound output control unit 78 reads position announcing sound data associated with the relative position condition which is determined by the relative position determination unit 76 as satisfying the relative position condition from the position announcing sound data storage unit 72, and outputs a sound based on the position announcing sound data via the sound output unit 80.

Figure 9:
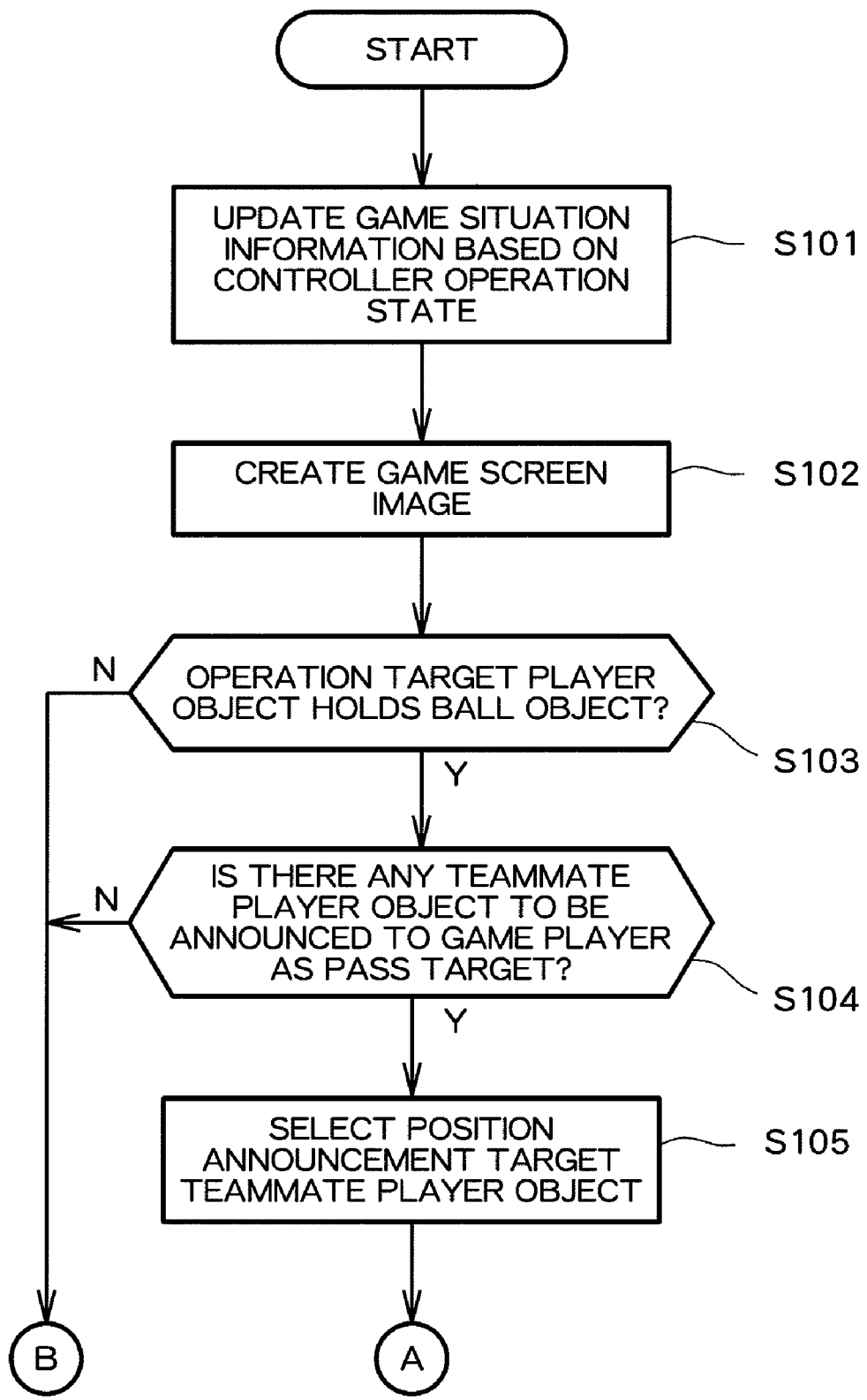
FIG. 9 is a flowchart of a process to be carried out in the game machine.
Figure 10:
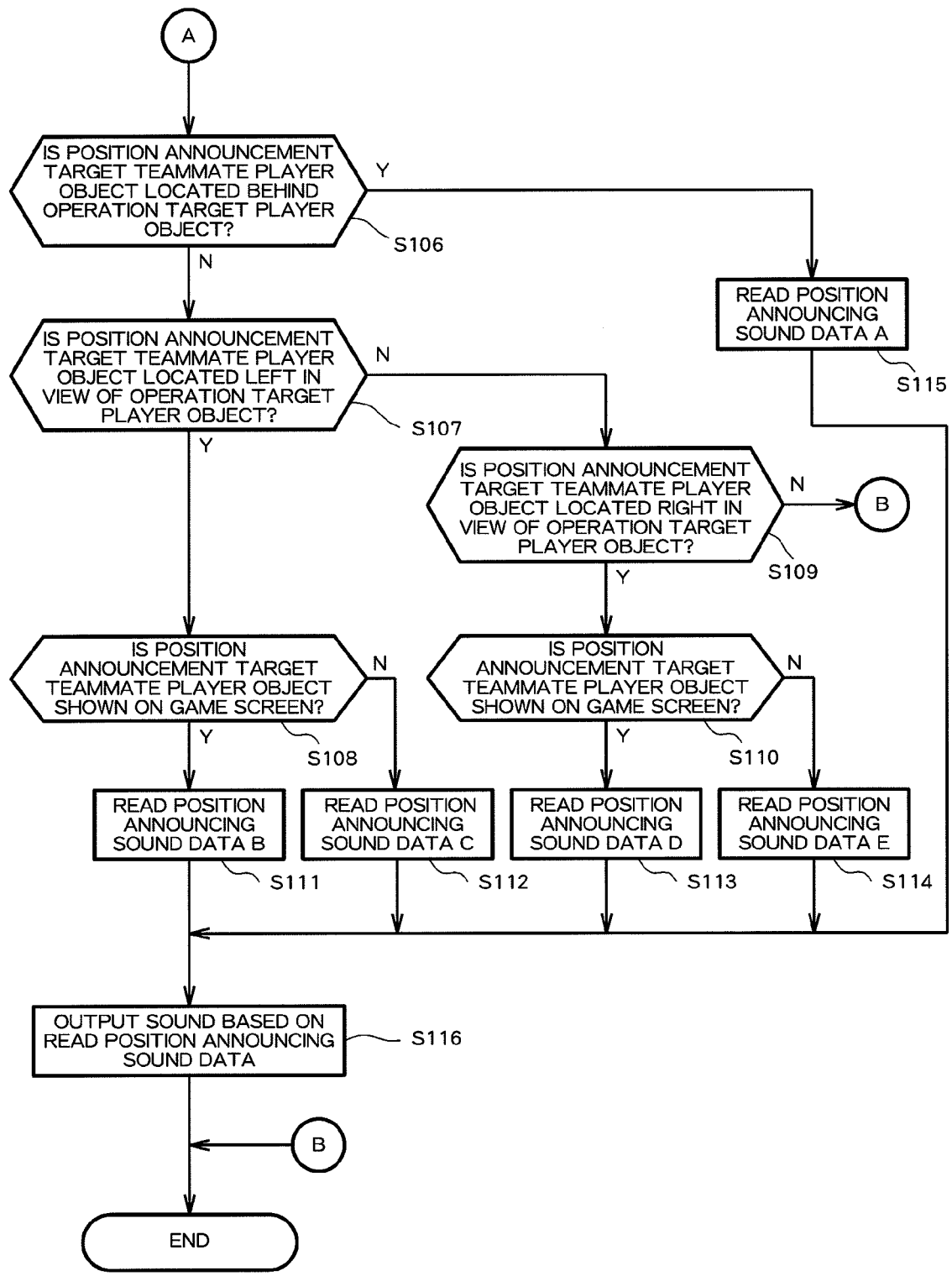
FIG. 10 is a flowchart of a process to be carried out in the game machine.

In the following, a process to be carried out in the game machine 10 will be described. FIGS. 9 and 10 are flowcharts of the process according to the present invention among those to be carried out in the game machine 10 for every predetermined period of time ($\frac{1}{60}^{th}$ of a second, for example). This process is realized by the microprocessor 14 executing a program read from the DVD-ROM 25.

As shown in FIG. 9, initially, the game situation information stored in the game situation information storage unit 70 is updated based on the operation state of the controller 32 (S101) Then, a game screen image is created in the VRAM (S102). Specifically, a game screen image representative of a picture obtained by viewing "the virtual three dimensional space 50 where the player object 56 and the ball object 62 are placed based on the game situation information stored in the game situation information storage unit 70" from the virtual camera 64 is created in the VRAM. The game screen image created in the VRAM is output to the monitor 18 for display at a predetermined timing.

Thereafter, a sound which announces the relative position of a teammate player object with no opponent player present nearby is output (S103 to S116).

Specifically, whether or not the operation target player object holds the ball object 62 is initially determined (S103). When it is determined that the operation target player object holds the ball object 62, whether or not there is any teammate player object who should be announced to the game player as a teammate player object to whom to pass the ball is then determined (S104). Here, the "teammate player object who should be announced to the game player as a teammate player object to whom to pass the ball" refers to a teammate player object having no opponent player object present nearby. In this embodiment, it is determined for every teammate player object whether or not there is any opponent player object in an area within a predetermined distance from that teammate player object to thereby determine whether or not there is any teammate player having no opponent player object present in an area within a predetermined distance from that teammate player.

When there is a teammate player object who should be announced to the game player as a teammate player object to whom to pass the ball (a pass target teammate player object), a position announcement target teammate player object is selected (S105). For example, when there is one pass target teammate player object, that teammate player object is selected as a position announcement target. When there are two or more pass target teammate player objects, the nearest teammate player object from the operation target player object is selected as a position announcement target.

Thereafter, whether or not the position announcement target teammate player object is located behind the operation target player object is determined (S106). When the position announcement target teammate player object is located behind the operation target player object, position announcing sound data A is read (S115).

Meanwhile, when the position announcement target teammate player object is not located behind the operation target player object, whether or not the position announcement target teammate player object is located on the left side in view of the operation target player object is determined (S107). When the position announcement target teammate player object is located on the left side in view of the operation target player object, whether or not that teammate player object is shown on the game screen is then determined (S108). The determination as to whether or not the teammate player object is shown on the game screen is made by calculating the position coordinates obtained by applying perspective projection conversion to the position coordinates of the reference position 58 of the teammate player object, for example, to see whether or not the calculated position coordinates are located within the game screen.

When it is determined that the position announcement target teammate player object is shown on the game screen, position announcing sound data B is read (S111). Meanwhile, when it is determined that the position announcement target teammate player object is not shown on the game screen, position announcing sound data C is read (S112).

When it is determined at S107 that the position announcement target teammate player object is not located on the left side in view of the operation target player object, whether or not the position announcement target teammate player object is located on the right side in view of the operation target player object is then determined (S109). When it is determined that the position announcement target teammate player object is located on the right side in view of the operation target player object, whether or not that teammate player object is shown on the game screen is then determined (S110). Then, when it is determined that the position announcement target teammate player object is shown on the game screen, position announcing sound data D is read (S113). Meanwhile, when it is determined that the position announcement target teammate player object is not shown on the game screen, position announcing sound data E is read (S114). It should be noted that when it is determined at S109 that the position announcement target teammate player object is not located on the right side from the point of view of the operation target player object, that is, when the position announcement target teammate player object is located directly in front of the operation target player object, no position announcing sound data is read, with the present process terminated.

In the case where the position announcing sound data is read at any of S111 to S115, a sound based on the read position announcing sound data is output via the sound output unit 80 (S116).

As described above, in the game machine 10, when there is any teammate player object with no opponent player object present nearby, a sound which announces the relative position of that teammate player object relative to the reference position 58 and reference direction 60 of the operation target player object is output. Thus, the game player can readily know the relative position of the teammate player object with no opponent player object present nearby, and can smoothly control the operation target player object so as to pass the ball to that teammate player object.

Also, in the game machine 10, a sound which announces differently is output even when similar announcement of relative positions is made, depending on whether or not the position announcement target teammate player object is shown on the game screen. The game player can thus know whether or not the position announcement target teammate player object is shown on the game screen.

It should be noted that the present invention is not limited to the above-described embodiment.

For example, the position announcing sound data storage unit 72 may store position announcing sound data in association with the respective areas relative to the reference position 58 and reference direction 60 of the operation target player object. More specifically, the areas may be defined as shown in FIG. 11, for example, and the respective areas may be stored in association with the respective position announcing sound data as shown in FIG. 12. In other words, position announcing sound data may be stored in association with the angle formed by the reference direction 60 (ahead direction) of the operation target player object and the direction directing from the position of the operation target player object to the position of the concerned teammate player object. Here, the areas "1" and "2" refer to the areas shown on the game screen, while the areas "3" to "7" refer to the areas not shown on the game screen. The above-described relative areas may be defined in further detail depending on the distance from the operation target player object.

In this case, when a position announcement target teammate player object is selected (S105), an area which contains the position of that teammate player position is determined and a sound based on the position announcing sound data associated with that area may be output in the process shown in FIGS. 9 and 10. Specifically, an angle formed by the reference direction 60 of the operation target player object and the direction directing from the position of the operation target player object to the position of the position announcement target teammate player object is obtained, and a sound based on the position announcing sound data associated with the range which contains that angle may be output.

Also, for example, with a sound output based on the position announcing sound data, whether or not the ball is passed in the direction announced by the sound may be determined so that subsequent output of a sound based on the position announcing sound data may be restricted depending on the result of the determination. Specifically, the number of times that a determination that the ball is not passed in the direction announced by the sound is made may be counted so that subsequent output of a sound based on the position announcing sound data may be restricted depending on the number. For example, with the counted number having reached a predetermined number of times, output of a sound based on the position announcing sound data may be suppressed.

The aforementioned number of times may be counted for each teammate player object. That is, when the position announcement target teammate player object is selected followed by output of a sound based on the position announcing sound data, but the ball is not passed in the direction announced by the sound, the counter corresponding to that teammate player object may be incremented. When the counter value corresponding to the teammate player object reaches a predetermined value, output of a sound related to that teammate player object based on the position announcing sound data may be restricted. For example, the teammate player object having a counter value having reached a predetermined value may not be thereafter selected as a position announcement target. Should the teammate player object be selected as a position announcement target, output of a sound based on the position announcing sound data may be suppressed.

Also, for example, a coalition parameter indicative of the trained level of each teammate player object in coalition play with the operation target player object may be stored, and output of a sound based on the position announcing sound data of that teammate player object may be restricted based on the coalition parameter value of that teammate player object. For example, for a teammate player object having a coalition parameter value smaller than a predetermined value, output of a sound based on the position announcing sound data may be suppressed. The coalition parameter value of a teammate player object may vary during the game. For example, the coalition parameter value of a teammate player object may increase upon successful passing of the ball between the operation target player object and that teammate player object.

The virtual game space created in the main memory 26 of the game machine 10 is not limited to a virtual three dimensional space defined using three coordinate elements, for example, but may be a two dimensional virtual space defined using two coordinate elements.

The soccer game (sport game) to be carried out in the game machine 10 is not limited to so-called stand-alone game, for example, but may be a network game to be played with game players of other game machines 10 connected via a communication network. In this case, a plurality of players may cooperatively operate one team.

Application of the present invention is not limited to a soccer game, for example, and the present invention can be applied to various sport games, including a basketball game and an ice hockey game, for example.

Figure 13:
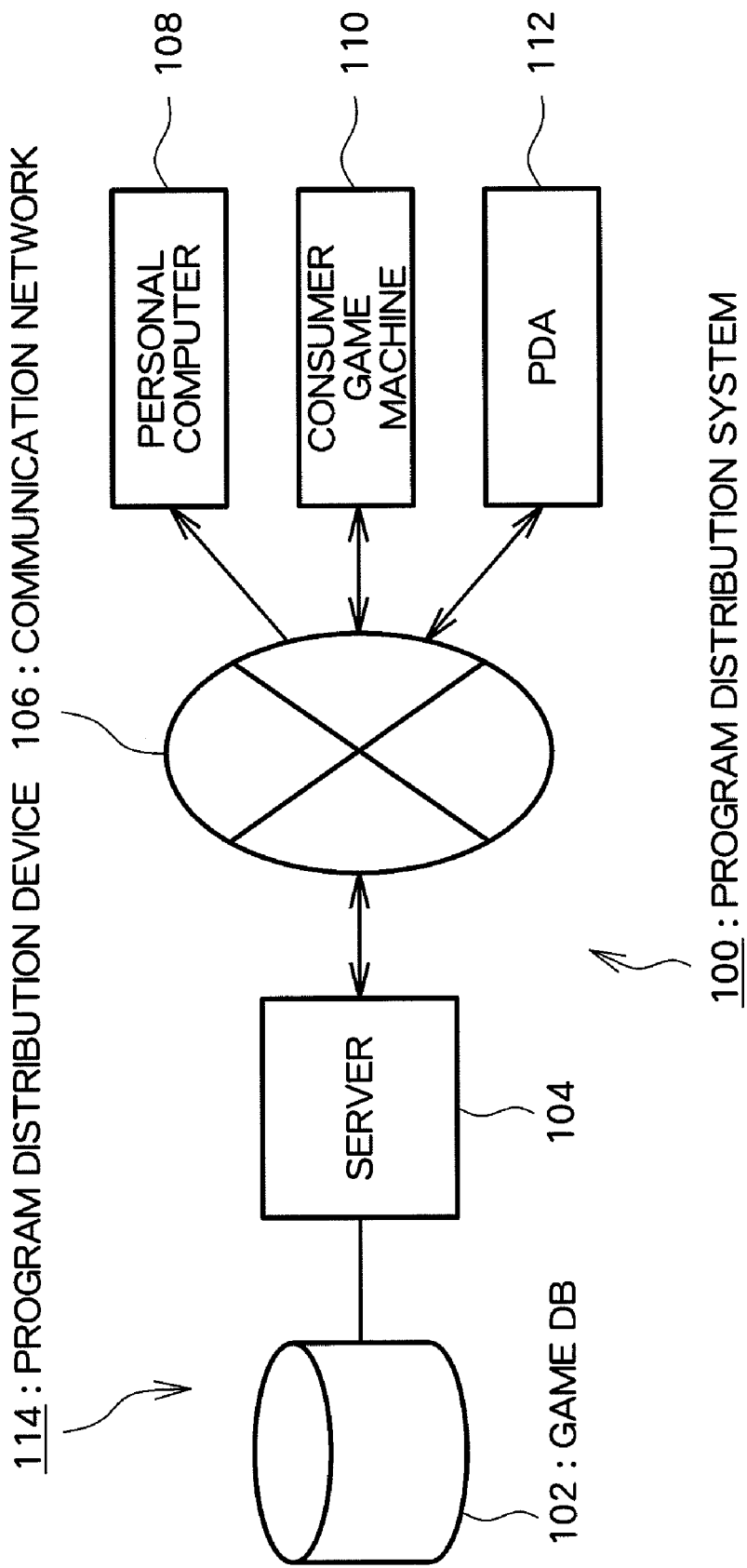
FIG. 13 is a diagram showing an overall structure of a program distribution system according to another embodiment of the present invention.

Although it is described in the above that the program is supplied from a DVD-ROM 25 or an information storage medium to the consumer game machine 11, the program may be distributed via a communication network to a home or the like. FIG. 13 is a diagram showing an overall structure of a program distribution system using a communication network. Referring to FIG. 13, a program distribution method according to the present invention will be described. As shown, the program distribution system 100 comprises a game database 102, a server 104, a communication network 106, a personal computer 108, a consumer game machine 110, and a PDA (a personal digital assistant) 112. Among those structural elements, the game database 102 and the server 104 together constitute a program distribution device 114. The communication network 106 comprises, for example, the Internet and/or a cable television network. In this system, the game database 102 (an information storage medium) stores a program having content identical to that recorded in the DVD-ROM 25. Then, when the user wishing to obtain a game requests game distribution, using the personal computer 108, the consumer game machine 110, the PDA 112, or the like, the request is transmitted via the communication network 106 to the server 104. In response to the game distribution request, the server 104 then reads the program from the game database 102, and sends to the entity, such as the personal computer 108, the consumer game machine 110, the PDA 112, or the like, which has made the game distribution request. Here, although it is described in the above that game distribution is carried out in response to a game distribution request, the server 104 may send a game unidirectionally. Also, all programs necessary to realize the game are not necessarily distributed all at once (collective distribution), but only game components necessary according to a particular aspect of the game may be distributed (divided distribution). As described above, game distribution via the communication network 106 makes it possible for the user wishing to obtain a program to readily obtain the program.

The invention claimed is:

1. A game machine for displaying a game screen image showing a picture obtained by viewing, from a predetermined viewpoint, a virtual three dimensional space where an operation target player object which moves according to an operation carried out by a game player and a plurality of teammate player objects belonging to the same team as a team to which the operation target player object belongs are placed, to thereby provide a sport game to be played by the team to which the operation target player object belongs and an opponent team, comprising:
a position announcing sound data storage unit that stores position announcing sound data in association with a combination of a first condition concerning a relative position of the teammate player object relative to a position and a reference direction of the operation target player object and a second condition for whether or not the teammate player object is displayed on the game screen;
a position announcement target selection unit that selects a position announcement target teammate player object from among the plurality of teammate player objects;
a first determination unit that determines whether the relative position of the teammate player object selected by the position announcement target selection unit, relative to the position and reference direction of the operation target player object, satisfies the first condition associated with the position announcing sound data;
a second determination unit that determines whether the teammate player object selected by the position announcement target selection unit satisfies the second condition associated with the position announcing sound data; and
a position announcing sound output control unit that outputs a sound based on the position announcing sound data in the case where the combination of the first condition and the second condition associated with the position announcing sound data is determined by the first determination unit and the second determination unit as satisfying the first condition and the second condition, respectively,
wherein the output of the sound data is restricted based on a coalition parameter indicative of a successful passing of a ball object between the operation target player object and the teammate object.

2. The game machine according to claim 1, wherein an opponent player object belonging to the opponent team is placed in the virtual three dimensional space, and the position announcement target selection unit determines whether to select the teammate player object as a position announcement target based on a position of the teammate player object and a position of the opponent player object.

3. A game machine control method for controlling a game machine for displaying a game screen image showing a picture obtained by viewing, from a predetermined viewpoint, a virtual three dimensional space where an operation target player object which moves according to an operation carried out by a game player and a plurality of teammate player objects belonging to the same team as a team to which the operation target player object belongs are placed, to thereby provide a sport game to be played by the team to which the operation target player object belongs and an opponent team, comprising:
selecting in a processor a teammate player object as a position announcement target from among the plurality of teammate player objects;
reading content stored in position announcing sound data storage unit that stores position announcing sound data in association with a combination of a first condition concerning a relative position of the teammate player object relative to a position and a reference direction of the operation target player object and a second condition for whether the teammate player object is displayed on the game screen;
first determining in the processor whether the relative position of the teammate player object selected at the selection, relative to the position and the reference direction of the operation target player object, satisfies the first condition associated with position announcing sound data;
second determining in the processor whether the teammate player object selected at the selecting satisfies the second condition associated with the position announcing sound data; and
causing a sound output unit to output a sound based on the position announcing sound data in the case where the combination of the first condition and the second condition associated with the position announcing sound data is determined at the first determining and the second determining as satisfying the first condition and the second condition, respectively,
wherein the output of the sound data is restricted based on a coalition parameter indicative of a successful passing of a ball object between the operation target player object and the teammate object.

4. A non-transitory computer readable information storage medium recording a program containing executable instructions for causing a computer to operate as a game machine for displaying a game screen image showing a picture obtained by viewing from a predetermined viewpoint a virtual three dimensional space where an operation target player object which moves according to an operation carried out by a game player and a plurality of teammate player objects belonging to the same team as a team to which the operation target player object belongs are placed, to thereby provide a sport game to be played by the team to which the operation target player object belongs and an opponent team, the computer operating as:
means for reading content stored in position announcing sound data storage means for storing position announcing sound data in association with a combination of a first condition concerning a relative position of the teammate player object relative to a position and a reference direction of the operation target player object and a second condition for whether the teammate player object is displayed on the game screen;

position announcement target selection means for selecting a position announcement target teammate player object from among the plurality of teammate player objects;

first determination means for determining whether or not the relative position of the teammate player object selected by the position announcement target selection means, relative to the position and reference direction of the operation target player object, satisfies the relative position condition associated with the position announcing sound data;

second determination means for determining whether the teammate player object selected by the position announcement target selection means satisfies the second condition associated with the position announcing sound data; and position announcing sound output control means outputting a sound based on the position announcing sound data in the case where the combination of the first condition and the second condition associated with the position announcing sound data is determined by the first determination means and the second determination means as satisfying the first condition and the second condition, respectively, wherein the output of the sound data is restricted based on a coalition parameter indicative of a successful passing of a ball object between the operation target player object and the teammate object.

5. The game machine according to claim 1, wherein
an opponent player object belonging to the opponent team is placed in the virtual three dimensional space, and
the position announcement target selection unit determines whether to select the teammate player object as a position announcement target based on a position of the teammate player object and a position of the opponent player object.

6. The game machine of claim 1, wherein the position announcing sound data storage unit stores the position announcing sound data based on an angle formed between the reference direction of the operation target player object and the position of the teammate player object.

7. A game machine for displaying a game screen image showing a picture obtained by viewing, from a predetermined viewpoint, a virtual three dimensional space where an operation target player object which moves according to an operation carried out by a game player and a plurality of teammate player objects belonging to the same team as a team to which the operation target player object belongs are placed, to thereby provide a sport game to be played by the team to which the operation target player object belongs and an opponent team, comprising:

a position announcing sound data storage unit that stores position announcing sound data in association with a combination of a first condition concerning a relative position of the teammate player object relative to a position and a reference direction of the operation target player object and a second condition for whether or not the teammate player object is displayed on the game screen;

a position announcement target selection unit that selects a position announcement target teammate player object from among the plurality of teammate player objects;

a first determination unit that determines whether the relative position of the teammate player object selected by the position announcement target selection unit, relative to the position and reference direction of the operation target player object, satisfies the first condition associated with the position announcing sound data;

a second determination unit that determines whether the teammate player object selected by the position announcement target selection unit satisfies the second condition associated with the position announcing sound data; and a position announcing sound output control unit that outputs a sound based on the position announcing sound data in the case where the combination of the first condition and the second condition associated with the position announcing sound data is determined by the first determination unit and the second determination unit as satisfying the first condition and the second condition, respectively, wherein a subsequent output of the sound is restricted based on a first number of times that a ball object is not passed from the operation target player object to the teammate player object in the reference direction announced by the sound, and wherein the first number of times is counted for each said teammate player object to restrict the subsequent output when a second number of times counted for the teammate player object has been exceed.

8. A game machine for displaying a game screen image showing a picture obtained by viewing, from a predetermined viewpoint, a virtual three dimensional space where an operation target player object which moves according to an operation carried out by a game player and a plurality of teammate player objects belonging to the same team as a team to which the operation target player object belongs are placed, to thereby provide a sport game to be played by the team to which the operation target player object belongs and an opponent team, comprising:

a position announcing sound data storage unit that stores position announcing sound data in association with a combination of a first condition concerning a relative position of the teammate player object relative to a position and a reference direction of the operation target player object and a second condition for whether or not the teammate player object is displayed on the game screen;

a position announcement target selection unit that selects a position announcement target teammate player object from among the plurality of teammate player objects;

a first determination unit that determines whether the relative position of the teammate player object selected by the position announcement target selection unit, relative to the position and reference direction of the operation target player object, satisfies the first condition associated with the position announcing sound data;

a second determination unit that determines whether the teammate player object selected by the position announcement target selection unit satisfies the second condition associated with the position announcing sound data;

a position announcing sound output control unit that outputs a sound based on the position announcing sound data in the case where the combination of the first condition and the second condition associated with the position announcing sound data is determined by the first determination unit and the second determination unit as satisfying the first condition and the second condition, respectively;

a third determination unit that determines, in the case where a sound is outputted based on the position announcing sound data, whether a pass is performed by the operation target player object in the direction corresponding to the position announcing sound data; and a restricting unit that restricts subsequent output of a sound based on the position announcing sound data depending on the result of the determination of the third determination unit.

9. The game machine of claim 8, comprising:
a unit that stores a value in association with each of the plurality of teammate player objects; and
a unit that updates the value stored in association with the teammate player objects selected by the position announcement target selection unit, based on the result of the determination of the third determination unit, wherein
the restricting unit restricts output of the sound based on the position announcing sound data in relation to the teammate player objects in the case where the value stored in association with the teammate player object reaches a predetermined value.

10. A game machine control method for controlling a game machine for displaying a game screen image showing a picture obtained by viewing, from a predetermined viewpoint, a virtual three dimensional space where an operation target player object which moves according to an operation carried out by a game player and a plurality of teammate player objects belonging to the same team as a team to which the operation target player object belongs are placed, to thereby provide a sport game to be played by the team to which the operation target player object belongs and an opponent team, comprising:
selecting in a processor a teammate player object as a position announcement target from among the plurality of teammate player objects;
reading content stored in position announcing sound data storage unit that stores position announcing sound data in association with a combination of a first condition concerning a relative position of the teammate player object relative to a position and a reference direction of the operation target player object and a second condition for
whether the teammate player object is displayed on the game screen;
first determining in the processor whether the relative position of the teammate player object selected at the selection, relative to the position and the reference direction of the operation target player object, satisfies the first condition associated with position announcing sound data;
second determining in the processor whether the teammate player object selected at the selecting satisfies the second condition associated with the position announcing sound data; and
causing a sound output unit to output a sound based on the position announcing sound data in the case where the combination of the first condition and the second condition associated with the position announcing sound data is determined at the first determining and the second determining as satisfying the first condition and the second condition, respectively,
wherein a subsequent output of the sound is restricted based on a first number of times that a ball object is not passed from the operation target player object to the teammate player object in the reference direction announced by the sound, and wherein the first number of times is counted for each said teammate player object to restrict the subsequent output when a second number of times counted for the teammate player object has been exceed.

11. A non-transitory computer readable information storage medium recording a program containing executable instructions for causing a computer to operate as a game machine for displaying a game screen image showing a picture obtained by viewing from a predetermined viewpoint a virtual three dimensional space where an operation target player object which moves according to an operation carried out by a game player and a plurality of teammate player objects belonging to the same team as a team to which the operation target player object belongs are placed, to thereby provide a sport game to be played by the team to which the operation target player object belongs and an opponent team, the computer operating as:
means for reading content stored in position announcing sound data storage means for storing position announcing sound data in association with a combination of a first condition concerning a relative position of the teammate player object relative to a position and a reference direction of the operation target player object and a second condition for whether the teammate player object is displayed on the game screen;
position announcement target selection means for selecting a position announcement target teammate player object from among the plurality of teammate player objects;
first determination means for determining whether or not the relative position of the teammate player object selected by the position announcement target selection means, relative to the position and reference direction of the operation target player object, satisfies the relative position condition associated with the position announcing sound data;
second determination means for determining whether the teammate player object selected by the position announcement target selection means satisfies the second condition associated with the position announcing sound data; and
position announcing sound output control means outputting a sound based on the position announcing sound data in the case where the combination of the first condition and the second condition associated with the position announcing sound data is determined by the first determination means and the second determination means as satisfying the first condition and the second condition, respectively,
wherein a subsequent output of the sound is restricted based on a first number of times that a ball object is not passed from the operation target player object to the teammate player object in the reference direction announced by the sound, and wherein the first number of times is counted for each said teammate player object to restrict the subsequent output when a second number of times counted for the teammate player object has been exceed.

12. A game machine control method for controlling a game machine for displaying a game screen image showing a picture obtained by viewing, from a predetermined viewpoint, a virtual three dimensional space where an operation target player object which moves according to an operation carried out by a game player and a plurality of teammate player objects belonging to the same team as a team to which the operation target player object belongs are placed, to thereby provide a sport game to be played by the team to which the operation target player object belongs and an opponent team, comprising:
  selecting in a processor a teammate player object as a position announcement target from among the plurality of teammate player objects;
  reading content stored in position announcing sound data storage unit that stores position announcing sound data in association with a combination of a first condition concerning a relative position of the teammate player object relative to a position and a reference direction of the operation target player object and a second condition for whether the teammate player object is displayed on the game screen;
  first determining in the processor whether the relative position of the teammate player object selected at the selection, relative to the position and the reference direction of the operation target player object, satisfies the first condition associated with position announcing sound data;
  second determining in the processor whether the teammate player object selected at the selecting satisfies the second condition associated with the position announcing sound data;
  causing a sound output unit to output a sound based on the position announcing sound data in the case where the combination of the first condition and the second condition associated with the position announcing sound data is determined at the first determining and the second determining as satisfying the first condition and the second condition, respectively;
  third determining in the processor, in the case where a sound is outputted based on the position announcing sound data, whether a pass is performed by the operation target player object in the direction corresponding to the position announcing sound data; and
  restricting subsequent output of a sound based on the position announcing sound data depending on the result of the determination of the third determining.

13. A non-transitory computer readable information storage medium recording a program containing executable instructions for causing a computer to operate as a game machine for displaying a game screen image showing a picture obtained by viewing from a predetermined viewpoint a virtual three dimensional space where an operation target player object which moves according to an operation carried out by a game player and a plurality of teammate player objects belonging to the same team as a team to which the operation target player object belongs are placed, to thereby provide a sport game to be played by the team to which the operation target player object belongs and an opponent team, the computer operating as:
  means for reading content stored in position announcing sound data storage means for storing position announcing sound data in association with a combination of a first condition concerning a relative position of the teammate player object relative to a position and a reference direction of the operation target player object and a second condition for whether the teammate player object is displayed on the game screen;
  position announcement target selection means for selecting a position announcement target teammate player object from among the plurality of teammate player objects;
  first determination means for determining whether or not the relative position of the teammate player object selected by the position announcement target selection means, relative to the position and reference direction of the operation target player object, satisfies the relative position condition associated with the position announcing sound data;
  second determination means for determining whether the teammate player object selected by the position announcement target selection means satisfies the second condition associated with the position announcing sound data;
  position announcing sound output control means outputting a sound based on the position announcing sound data in the case where the combination of the first condition and the second condition associated with the position announcing sound data is determined by the first determination means and the second determination means as satisfying the first condition and the second condition, respectively;
  third determination means for determining, in the case where a sound is outputted based on the position announcing sound data, whether a pass is performed by the operation target player object in the direction corresponding to the position announcing sound data; and
  restricting means for restricting subsequent output of a sound based on the position announcing sound data depending on the result of the determination of the third determination means.

* * * * *